3,463,350
PLASTIC CONTAINER FOR FOODSTUFFS SUSCEPTIBLE TO OXIDATIVE DETERIORATION
Harold W. Unger, Oakbrook, Ill., assignor to Continental Can Company, Inc., New York, N.Y., a corporation of New York
Filed Oct. 19, 1967, Ser. No. 676,543
Int. Cl. B65d 7/42
U.S. Cl. 220—83        6 Claims

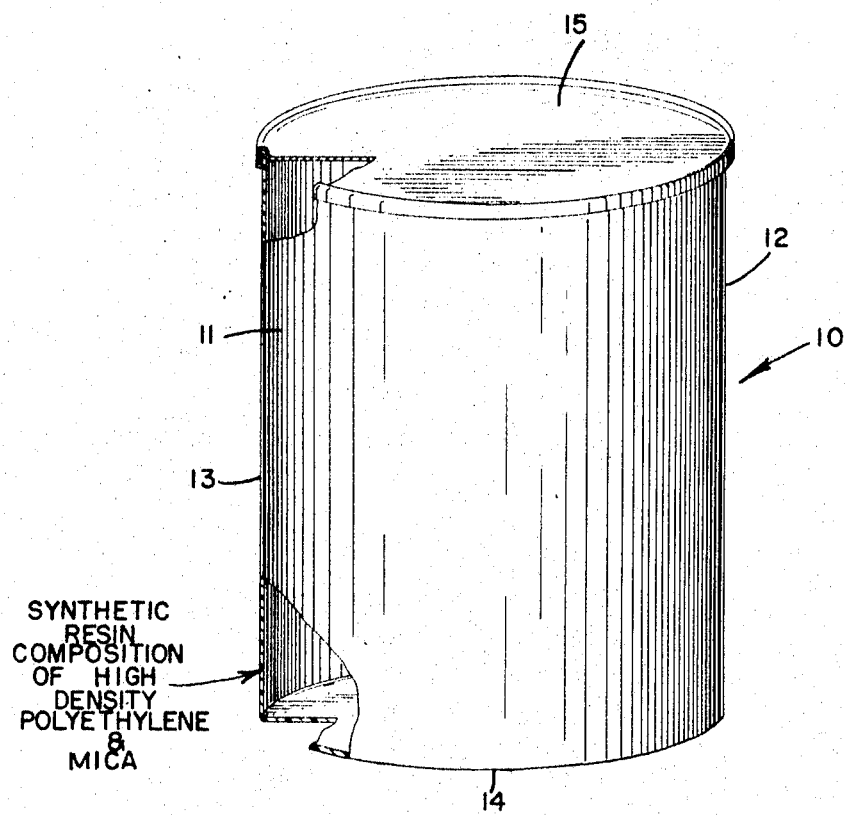

ABSTRACT OF THE DISCLOSURE

A sealable synthetic resin container characterized by enhanced resistance to permeation by oxygen is molded from a mixture of high density polyethylene and mica.

BACKGROUND OF INVENTION

Field of invention

This invention relates to a plastic container for food and more particularly to a plastic container for foodstuffs which are highly susceptible to oxidative deterioration.

The prior art

In the manufacture of canned foodstuffs, such as meat products, as corned beef hash, chili, beef stew, ham, and the like foodstuff materials, the containers, usually metal cans, are filled with the foodstuff, covered, and sealed. These cans are generally made of metal, suitably of tin plate. The sealed cans are then placed in a steam retort or similar cooker and cooked, frequently under pressure, for about 1 to 2 hours, the amount of pressure and the time of cooking depending upon the kind of meat and the size of the can used.

One of the disadvantages of canning meat in metal may corrode the metal, and such corrosion usually results in contamination and deterioration of the product. In order to overcome these disadvantages, the cans are generally provided with a lacquer coating. However, such coated containers, due to the imperfections in the coatings, still present a corrosion problem.

Attempts to substitute inert synthetic resin materials such as polyethylene for metal in the canning of foodstuffs which are highly susceptible to oxidative deterioration have encountered the main disadvantage that such resin materials are ofttimes excessively permeable to oxygen. The permeation of oxygen into the container causes a discoloration and a depreciation in the taste qualities of the canned foodstuff which is undesirable.

The permeability characteristics of synthetic resins such as polyethylene with respect to oxygen has resulted in polyethylene containers being rejected in the packing of oxygen-sensitive foods where, due to its chemical inertness, it might otherwise be employed to great advantage.

SUMMARY OF THE INVENTION

In accordance with the present invention, there is provided a method for the preparation of synthetic resin containers having enhanced resistance to permeation by oxygen and adapted to be used for the packaging of foodstuffs highly susceptible to oxidative deterioration wherein the container is molded from a mixture of high-density polyethylene and mica.

It has been found that containers prepared in accordance with the method of the present invention have substantially improved resistance to the permeation of air and, as a result, may be used for the canning of a variety of foodstuffs, especially proteinaceous materials, such as meats, without deterioration or significant discoloration of the canned material during storage.

PREFERRED EMBODIMENTS

High-density polyethylene is defined for the purposes of the present invention as polyethylene having a density of 0.940 to 0.970 g./cc. Low density polyethylene, i.e., polyethylene having a density below 0.940 g./cc. as will hereafter be disclosed, is unsuitable for forming plastic containers useful in the packaging of oxygen-sensitive foodstuffs as the resin has an unsatisfactorily high permeability to oxygen.

The mica employed in the present invention is comprised of particles of fine mesh. Thus, a fineness in the range of about 100 to about 500 mesh have been found to be satisfactory. Particles of about 325 mesh are preferred. Examples of suitable micas which may be employed in the invention are the micas of commerce, such as muscovite and phlogophite.

The polyethylene compositions used to prepare the containers of the present invention contain about 50 to about 90 percent by weight high density polyethylene and about 10 to about 50 percent by weight of the mica. It is found that compositions containing between about 40 to about 80 percent by weight of the high density polyethylene and between about 20 to about 60 percent by weight of the mica are most desirable and are preferred.

The addition of the mica particles to the high density polyethylene can be accomplished in any convenient manner so long as there is obtained a thorough distribution of the mica throughout the polyethylene. Various conventional equipment which may be used to interknead and mix the high density polyethylene and mica particles and include open roll mills, plastics extruders, Banbury mills, and the like.

It is to be understood that minor amounts of other compounding ingredients, such as pigments as $TiO_2$, U.V. stabilizers, such as carbon black, anti-static agents, and the like, may also be incorporated in the polyethylene in amounts which do not deleteriously effect the oxygen permeability of the polyethylene containers of the present invention.

The polyethylene-mica blend compositions of the present invention may be molded into conventional sealable container body constructions of the metal container art by a number of conventional molding procedures, such as compression or injection molding. The can may be sealed by means of metal closures which are conventionally used in the metal container art.

In the drawing, there is shown a view in perspective, partially in section, of a can 10 prepared in accordance with one embodiment of the invention. The container 10 is provided with plastic body 11 having side walls 12, 13 and bottom wall 14 which is molded from a mixture of polyethylene and mica. The can 10 is sealed with a metal lid 15.

A particularly preferred can body construction into which the polyethylene-mica blends may be molded is disclosed in U.S. Patents 3,186,582 and 3,259,267.

Having generally described the invention, the following examples are presented for purposes of illustration of various embodiments thereof.

EXAMPLE I

A mixture of 80 percent by weight of total composition of high-density polyethylene (density 0.96) having a melt index of 5.0, and 20 percent by weight of muscovite mica having a specific gravity of 2.8–3.0, a bulk density of 10 lb./cu. ft. and a particle size of 325 mesh, were blended by tumbling and then extruding through a twin screw extruder.

A tapered can 40 to 45 mils thick, was molded from the blend using a Husky 150P injection molding machine at a temperature of about 400° F. and a pressure of about 10,000 p.s.i.

The molded polyethylene containers were filled with corned beef hash and sealed with a metal lid. The sealed containers were stored in a pressure vessel which was maintained at a pressure of 5 p.s.i.g. with oxygen for a 4-week period. At the end of this storage period, the containers were opened and the contents examined for discoloration.

Container bodies prepared in an identical manner from a molding resin mixture of high-density polyethylene containing about 10% to 15% glass fibers, and a molding resin mixture of 94% by weight high-density polyethylene and 6% by weight of titanium dioxide were also filled with corned beef hash and sealed. These containers, which were used as controls, were also stored for a 4-week period under oxygen pressure.

The visual observations of the color condition of the canned corned beef hash after the expiration of the storage period is recorded in table below.

TABLE I

| Run No. | Polyethylene mixture used to prepare container | Appearance of corned beef hash after 4-week storage in pressurized oxygen |
| --- | --- | --- |
| 1 | Polyethylene-mica | Slight brown discoloration of the hash portion next to the wall of the container. |
| 2 | Polyethylene-glass fiber. | Brown discoloration of the hash portion next to the wall of the container, discoloration extending into the hash ½ inch from the wall. |
| 3 | Polyethylene-TiO$_2$ | Brown discoloration of the hash portion next to the wall of the container, discoloration extending into the hash ⅝ inch from the wall. |

EXAMPLE II

A series of 5-mil sheets was compression molded from molding resins prepared from varying mixtures of high-density polyethylene (HDPE) and muscovite mica having a particle size of 325 mesh. The specific air permeability of the sheets was determined with an Aminco Permeater, available from American Instrument Company.

Sheets prepared from unmodified, high-density polyethylene, unmodified low-density polyethylene, i.e., polyethylene having a melt index of 0.4 and a density of 0.92, and a mixture of 80 percent by weight low density polyethylene (LDPE) and 20 percent by weight muscovite mica having a particle size of 325 mesh were used as controls. The specific air permeabilities of the sheets prepared from the high-density polyethylene-mica mixtures and the control samples are recorded in Table II below.

TABLE II

| Run No. | Polyethylene type | Amount polyethylene (wt. percent) | Amount mica (wt. percent) | Specific air permeability ×10⁻⁴ ft.³/mil/ft.²/day/p.s.i. (avg. 2 readings) |
| --- | --- | --- | --- | --- |
| 1 | HDPE | 80 | 20 | 0.60 |
| 2 | HDPE | 70 | 30 | 0.41 |
| 3 | HDPE | 60 | 40 | 0.54 |
| 4 | HDPE | 100 | 0 | 1.83 |
| 5 | LDPE | 100 | 0 | 11.57 |
| 6 | LDPE | 80 | 20 | 3.27 |

From the foregoing examples, it is apparent that containers molded from mixtures of high-density polyethylene and mica in accordance with the method of the present invention (Runs Nos. 1–3) exhibit a marked decrease in permeation to oxygen when compared with unmodified high-density polyethylene (Run No. 4) or low-density polyethylene modified with mica. (Run No. 6)

As the surfaces of the containers prepared in accordance with the present invention substantially prevent the passage of gases, such as oxygen, through the plastic substrate, they may be satisfactorily employed to package foodstuff materials which are highly susceptible to oxidative deterioration.

What is claimed is:

1. A method for preparing a synthetic resin container having enhanced resistance to permeation by oxygen and adapted to be used for the packaging of foodstuffs highly susceptible to oxidative deterioration which comprises preparing a synthetic resin molding mixture of a high-density polyethylene and mica particles and then molding the mixture into a sealable container.

2. The method of claim 1 wherein the molding mixture is comprised of about 50 to about 90 percent by weight high-density polyethylene and about 10 to about 50 percent by weight mica.

3. The method of claim 1 wherein the molding mixture is comprised of about 60 to about 80 percent by weight high-density polyethylene and about 20 to about 40 percen by weight mica.

4. A can construction for the packaging of foodstuffs highly susceptible to oxidative deterioration consisting of a can body and a can end permanently secured to said can body, said can body being molded from a synthetic resin which is characterized by having enhanced resistance to permeation by oxygen, said resin being comprised of a mixture of high-density polyethylene and mica.

5. A can construction of claim 4 wherein the can body is molded from a synthetic resin which is comprised of about 50 to about 90 percent by weight high-density polyethylene and about 10 to about 50 percent by weight mica.

6. A can construction of claim 4 wherein the can body is molded from a synthetic resin which is comprised of about 60 to about 80 percent by weight high-density polyethylene and about 20 to about 40 percent by weight mica.

References Cited

UNITED STATES PATENTS 2,739,881   3/1956   Kepple _____ 220—83

JAMES B. MARBERT, Primary Examiner

U.S. Cl. X.R.

221—232, 251, 272